(12) United States Patent
Paver et al.

(10) Patent No.: US 7,865,675 B2
(45) Date of Patent: Jan. 4, 2011

(54) CONTROLLING CLEANING OF DATA VALUES WITHIN A HARDWARE ACCELERATOR

(75) Inventors: Nigel Charles Paver, Austin, TX (US); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 105 days.

(21) Appl. No.: 12/000,005

(22) Filed: Dec. 6, 2007

(65) Prior Publication Data

US 2009/0150620 A1 Jun. 11, 2009

(51) Int. Cl.
*G06F 12/00* (2006.01)
*G06F 15/76* (2006.01)

(52) U.S. Cl. .................. 711/154; 711/135; 711/207; 712/34

(58) Field of Classification Search .................. 711/151, 711/135; 710/5; 712/34, 35
See application file for complete search history.

(56) References Cited

U.S. PATENT DOCUMENTS

| | | | |
|---|---|---|---|
| 5,845,327 A | 12/1998 | Rickard et al. | |
| 6,684,305 B1 * | 1/2004 | Deneau | 711/159 |
| 2003/0028751 A1 * | 2/2003 | McDonald et al. | 712/34 |
| 2004/0215898 A1 * | 10/2004 | Arimilli et al. | 711/144 |
| 2005/0216701 A1 * | 9/2005 | Taylor | 712/34 |
| 2006/0064546 A1 | 3/2006 | Arita et al. | |
| 2006/0200802 A1 * | 9/2006 | Mott et al. | 717/120 |
| 2007/0199046 A1 | 8/2007 | O'Brien | |
| 2008/0098205 A1 * | 4/2008 | Dolve et al. | 712/220 |
| 2008/0222383 A1 * | 9/2008 | Spracklen et al. | 711/207 |

FOREIGN PATENT DOCUMENTS

| | | |
|---|---|---|
| WO | WO 99/61982 | 12/1999 |
| WO | WO 99/61989 | 12/1999 |
| WO | WO 2004/046916 | 6/2004 |
| WO | WO 2005/101213 | 10/2005 |
| WO | WO 2006/131921 | 12/2006 |

OTHER PUBLICATIONS

M. Vuletic et al, "Multithreaded Virtual-Memory-Enabled Reconfigurable Hardware Accelerators" IEEE Conf. Field Programmable Technology, Dec. 2006, pp. 197-204.
UK Search Report dated Jan. 19, 2009 for GB 081825.1.
UK Search Report dated Feb. 23, 2009 for GB 0820711.0.
UK Search Report dated Feb. 20, 2009 for GB 0820439.8.
U.S. Appl. No. 12/003,858, Paver et al., filed Jan. 2, 2008.
U.S. Appl. No. 12/003,857, Paver et al, filed Jan. 2, 2008.

* cited by examiner

*Primary Examiner*—Shane M Thomas
(74) *Attorney, Agent, or Firm*—Nixon & Vanderhye P.C.

(57) ABSTRACT

A data processing apparatus 2 includes a programmable general purpose processor 10 coupled to a hardware accelerator 12. A memory system 14, 6, 8 is shared by the processor 10 and the hardware accelerator 12. Memory system monitoring circuitry 16 is responsive to one or more predetermined operations performed by the processor 10 upon the memory system 14, 6, 8 to generate a trigger to the hardware accelerator 12 for it to halt its processing operations and clean any data values held as temporary variables within registers 20 of the hardware accelerator back to the memory system 14, 6, 8.

27 Claims, 5 Drawing Sheets

CONTROLLING CLEANING OF DATA VALUES WITHIN A HARDWARE ACCELERATOR

BACKGROUND OF THE INVENTION

1. Field of the Invention

This invention relates to the field of data processing systems. More particularly, this invention relates to data processing systems having a programmable general purpose processor and a hardware accelerator.

2. Description of the Prior Art

It is known to provide systems combining a programmable general purpose processor with a hardware accelerator. Such systems may share a memory system in order to facilitate the sharing of data values. With such an arrangement, there is a requirement to coordinate the manipulation and management of the data values stored within the memory system. As an example, processing being performed by the programmable general purpose processor may require the paging in and paging out of regions of memory which are also being accessed by the hardware accelerator. If such paging operations were performed without taking into account the requirements of the hardware accelerator, then data required by the hardware accelerator may be inappropriately paged out, and perhaps more seriously data which has been modified by the hardware accelerator, but not yet run back to the memory system, may have the out-of-date memory system copy of that data paged out resulting in incorrect values being held for those data values.

In order to address these issues, it is known to provide an operating system executing on the programmable general purpose computer which is able to control and coordinate memory management so as to take into account the requirements and the state of both the processor and the hardware accelerator. Using the operating system in this way requires that it be modified as to be able to appropriately handle the requirements of the hardware accelerator and the data generated by the hardware accelerator. There are a wide variety of different forms of hardware accelerator which may be provided with these different forms being targeted at different potential uses of the system. As an example, a hardware accelerator directed toward encryption may be provided in one system and a hardware accelerator significantly differing in form and directed towards another use, such as video processing may be provided in another system. Having separate operating systems, or versions each capable of dealing with these differing hardware accelerators or even a single operating system able to deal with a wide variety of different hardware accelerators is a significant practical difficulty. As a new hardware accelerator is developed for a new purpose, then operating system code would need to be modified and revalidated in order to support such a new hardware accelerator. This is time consuming, expensive and may be impractical in the case a low volume product.

SUMMARY OF THE INVENTION

Viewed from one aspect the present invention provides apparatus for processing data comprising:

a programmable general purpose processor operating under program instruction control to perform data processing operations;

a memory system coupled to said processor, said memory system operating to store data values to be processed by said processor;

a hardware accelerator coupled to said processor and to said memory system, said hardware accelerator having one or more registers storing respective data values that are temporary variables to be processed by said hardware accelerator, said data values within said one or more registers being read from said memory system and cached within said one or more registers; and system monitoring circuitry coupled to said hardware accelerator, said memory system monitoring circuitry generating a trigger signal in response to one or more predetermined operations being preformed within said apparatus; wherein said hardware accelerator is responsive to said trigger signal to halt processing being performed by said hardware accelerator and to perform a cleaning operation whereby any data values within said one or more registers differing from the corresponding data values within said memory system are written back to said memory system.

The present technique recognises that the circumstances which arise due to the processing by the programmable general purpose processor resulting in a need to halt the processing by the hardware accelerator and clean the data values held by the hardware accelerator are constrained and can be reliably identified by system monitoring circuitry associated with the hardware accelerator. The hardware accelerator in this way can itself be responsible for ensuing that it halts its operation and cleans any data values it is storing back to the memory system should one or more predetermined operations (indicative of this requirement) be detected within the system. Thus, for example, the operating system of the programmable general purpose processor need no longer be responsible for the halting of processing by, and the cleaning of data values from, the hardware accelerator thereby avoiding the need to modify the operating system to take account of different hardware accelerators which may or may not be present. Instead, the present technique recognises that characteristic operations occur (driven by the general purpose processor) which are indicative of the need to halt processing by the hardware accelerator and for cleaning the data values stored within the hardware accelerator. Furthermore, these predetermined operations are sufficiently well defined that they can be efficiently detected with dedicated hardware associated with the hardware accelerator.

Whilst it will be appreciated that the predetermined operations could take a wide variety of different forms, such as a context switch by the programmable general purpose computer, the present techniques are well suited to embodiments in which the system monitoring circuitry comprises memory system monitoring circuitry and the trigger signal is generated in response to one or more predetermined memory operations being performed upon the memory system by the processor.

The one or more predetermined memory operations being performed can themselves take a variety of different forms depending upon the particular configuration of the system. Examples include an invalidate of an entry within a system including a translation lookaside buffer where the invalidated entry corresponds to a data value being used by the hardware accelerator; a modification of a page table data entry corresponding to a data value being used by the hardware accelerator in a system including a memory management unit; an invalidate and clean operation being performed upon one or more cache lines of a cache memory storing data corresponding to data values subject to processing via the hardware accelerator; a clean operation being performed upon one or more cache lines of a cache memory storing data corresponding to data values subject to processing via the hardware accelerator; a cache snoop operation being performed upon one or more cache lines of a cache memory storing data corresponding to data values subject to processing via the hardware accelerator; and further examples.

In some example systems the processor may, as part of its normal operation, generate broadcast memory management commands and these can be directly used by the memory system monitoring circuit to detect the one or more predetermined memory operations indicative of a need to stop processing by the hardware accelerator and clean the data values stored by the hardware accelerator back to the memory system.

Another example of one or more predetermined memory operations indicative of the need to trigger the above type of recovery action by the hardware accelerator would be accesses by the processor to data values within regions of memory address space that are being used by the hardware accelerator. There are few legitimate circumstances in which a processor would be expected to concurrently access data values being worked upon by a hardware accelerator.

Whilst the processor may operate in a number of different ways in performing its own memory management, it would be most common that it would operate under control of an operating system with this operating system managing the memory system and with this management by the operating system being independent of the presence and state of the hardware accelerator.

Whilst it is possible that the hardware accelerator could be provided with a specially partitioned memory region, sharing of data, at least for the purpose of input and output can be more readily achieved when the data values to be processed by the hardware accelerator are stored within one or more regions of the memory system that are shared (although not concurrently used) with the processor.

The processor and the hardware accelerator may conveniently operate within a common virtual memory address space. This virtual memory address space can be managed by an operating system executing on the processor. The processor and hardware accelerator can share a memory management unit and page table data or, in other embodiments where the processor and the hardware accelerator operate in different contexts, it may be appropriate to provide each with its own memory management unit and page table data (at least logically).

Viewed from a further aspect the present invention provides apparatus for processing data comprising:

programmable general purpose processor means for performing data processing operations operating under program instruction control;

memory system means coupled to said processor means for storing data values to be processed by said processor means;

hardware accelerator means coupled to said processor means and to said memory system means, said hardware accelerator means having one or more register means for storing respective data values that are temporary variables to be processed by said hardware accelerator means, said data values within said one or more register means being read from said memory system means and cached within said one or more register means; and system monitoring circuitry coupled to said hardware accelerator, said memory system monitoring circuitry generating a trigger signal in response to one or more predetermined operations being preformed within said apparatus; wherein said hardware accelerator means is responsive to said trigger signal to halt processing being performed by said hardware accelerator means and to perform a cleaning operation whereby any data values within said one or more register means differing from the corresponding data values within said memory system means are written back to said memory system means.

Viewed from a further aspect the present invention provides a method of processing data comprising the steps of:

performing data processing operations with a programmable general purpose processor operating under program instruction control;

storing data values to be processed by said processor in a memory system coupled to said processor;

storing within one or registers of a hardware accelerator respective data values that are temporary variables to be processed by said hardware accelerator, said hardware accelerator being coupled to said processor and to said memory system and said data values within said one or more registers being read from said memory system and cached within said one or more registers; and generating a trigger signal in response to one or more predetermined operations being preformed within said apparatus using system monitoring circuitry coupled to said hardware accelerator; and in response to said trigger signal halting processing being performed by said hardware accelerator and performing a cleaning operation whereby any data values within said one or more registers differing from the corresponding data values within said memory system are written back to said memory system.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
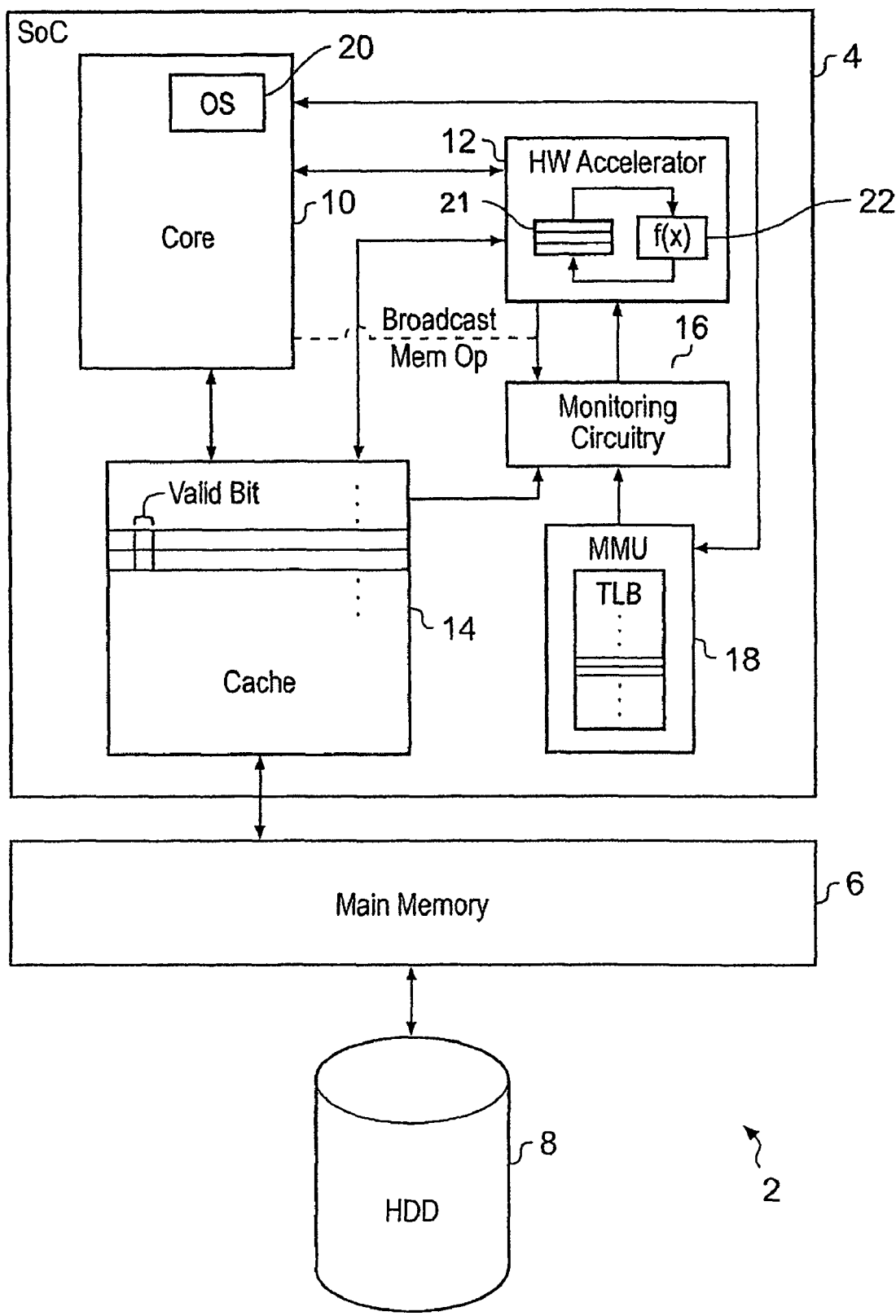
FIG. 1 schematically illustrates a data processing system including a programmable general purpose processor, a hardware accelerator and a memory system.

FIG. 1 schematically illustrates an apparatus for processing data 2 including an integrated circuit system-on-chip 4 connected to a main memory 6 that is in turn connected to a non-volatile memory in the form of a hard disk drive 8. Within the integrated circuit 4 there is provided a programmable general purpose processor 10, such as an ARM processor core, a hardware accelerator 12 and a cache memory 14. Also present within the integrated circuit 4 are memory system monitoring circuitry 16 and a memory management unit 18.

The normal operation of the apparatus for processing data 2 illustrated in FIG. 1, other than the action of the hardware accelerator 14 and the memory system monitoring circuitry 16, will be familiar to those in this technical field. In particular, the cache memory 14, the main memory 6 and the hard disk drive 8 together provide a hierarchical memory system. The memory management unit 18 incorporates a translation lookaside buffer 18 storing page table entries defining virtual-to-physical address mappings. An operating system 20 executed on the programmable general purpose processor 10 controls the memory system 14, 6, 8 so as to perform memory operations such as paging in and paging out of memory regions between the main memory 6 and the hard disk drive 8 in dependence upon the current requirements of the application program(s) executed by the programmable general purpose processor 10. The operating system 20 may support virtual memory via the use of the memory management unit 18 and its translation lookaside buffer storing page table entry data. The main page table data can be stored within the main memory 6.

The hardware accelerator coupled to the programmable general purpose processor 10 and the memory system 14, 6, 8 serves to perform processing operations delegated to it by the programmable general purpose processor 10. Thus, processing functions such as computationally intensive encryption or decryption processing, media processing or other such processing activities can be performed by the hardware accelerator 12 upon data stored within the same memory system 14, 6, 8 which is used by the programmable general purpose processor 10. The hardware accelerator 12 incorporates registers 21 which store temporary variables being processed by or used by the hardware accelerator 12 at any given point in time. Processing logic 22 within the hardware accelerator 12 performs the desired manipulation/processing upon the temporary variables. The temporary variables are read from the memory system 14, 6, 8 and effectively cached within the registers 21 during operation of the hardware accelerator 12. Examples of temporary variables would be input data values to be manipulated, output data values representing results produced and needing to be written back to the memory system 14, 16, 8, pointers for input data and output data that are updated as processing proceeds in the hardware accelerator 12 and other forms of temporary variable. A characteristic of the cached nature of the temporary variables held within the hardware accelerator 12 is that, if the hardware accelerator 12 is to cease its operation, then it is important that any of these temporary variables which have been changed by the hardware accelerator 12, but not yet written back into the memory system 14, 6, 8, should be written back such that the data values are cleaned from the hardware accelerator 12 and data integrity/consistency is maintained.

The memory system monitoring circuitry 16 is responsive to signals within the MMU 18 and the cache 14 to detect memory system operations indicative of the programmable general purpose processor 10 performing processing operations with the result that it is no longer proper or possible for the hardware accelerator 12 to continue its current operation(s). Examples of such predetermined memory system operations include the invalidation of an entry within the translation lookaside buffer of the memory management unit 18, modification of an entry within the page table and a clean and invalidate operation within the cache 14 to a cache line storing a data value that is being used by the hardware accelerator 12. The above predetermined memory system operations are all indicative of operations that are performed under control of the operating system 20 in preparation for paging out data from the low order part of the memory system 14, 6 so as to be stored only on the hard disk drive 8. In order to ensure proper memory system operation and consistency, operating systems are carefully designed and constrained such that they perform a well controlled sequence of invalidation and cleaning operations before paging out data. These well defined predetermined memory system operations are detected by the memory system monitoring circuitry 16 and result in the generation of a trigger signal supplied to the hardware accelerator 12 which serves to trigger the hardware accelerator 12 to halt processing and perform a cleaning operation(s) whereby any data values held within the registers 21, which differ from the corresponding data values within the memory system 14, 6, 8, are cleaned (i.e. written out to the memory system 14, 6, 8).

A variety of different arrangements of the memory system configuration may be used. In some embodiments the programmable general purpose processor 10 and the hardware accelerator 12 may be operate within the same context with the hardware accelerator 12 providing assistance in performing computationally intensive tasks within the context which is currently active on the programmable general purpose processor 10. In other embodiments it would also be possible for the programmable general purpose processor 10 and the hardware accelerator 12 to operate in different contexts with their own page tables and virtual to physical address mappings.

Also illustrated in FIG. 1 is the possibility of the programmable general purpose processor 10 generating broadcast signals indicative of memory operations being performed. Some processor architectures for such programmable general purpose processors 10 generate broadcast memory operation signals so as to facilitate the coordination of memory control across a multiprocessing environment. If available, the memory system monitoring circuitry 16 may be responsive to such broadcast memory operation signals in addition to the previously described "snooping" performed upon the cache 14 and the memory management unit 18, or possibly instead of such "snooping".

It will be appreciated that if the hardware accelerator 12 is to perform cleaning of its data values out to the memory system 14, 6, 8, then this should be completed before any memory system change being produced by the operating system 20 is brought into effect. This can be achieved by having the memory system monitoring circuitry 16 detect the appropriate predetermined memory system operations being performed and hold off (stall) these memory system operations whilst the hardware accelerator 12 undertakes its cleaning operations. At the level of the operating system 12 such activity appears the same as a slow memory access and the additional delay associated with the cleaning of the hardware accelerator 12 does not cause any particular problem.

By way of example, the predetermined memory system operations under the ARM Architecture associated with disabling a page of memory may be considered. The operating system may decide to disable a page as part of its recently used detection routines (to find candidate physical memory for swapping), or as a precursor to swapping a page with backing store (hard disk drive 8). In the event that the operating system disables a page that the hardware accelerator 12 is using, the hardware accelerator 12 should stop using that page (halt its processing) and desirably should clean any data values it has within its registers 21 that fall within the page being disabled such that if that page is swapped then data consistency will not be lost. The hardware accelerator 12 accordingly responds to the trigger signal from the memory system monitoring circuitry 16 to halt its processing, and may optionally signal back to the programmable general purpose processor 10 that it was in fact using that page as this may cause the operating system 20 not to swap that page. This is equivalent to a CPU thread "touching" a disabled page and raising an abort.

The steps that an operating system generally will go through in order to disable a page are (in pseudo-code):

| | Write new page table entry |
|---|---|
| DMB | ensure write has completed to memory |
| TLB Invalidate: | ensure cached pages are reread from memory |
| DMB | ensure TLB invalidate complete |
| IMB | ensure no instructions using old mapping |

The technique in this case recognises that by observing the "TLB Invalidate" command the memory system monitoring circuitry 16 can gain an indication that a page the hardware accelerator 12 requires is no longer valid. The "TBL Invalidate" command could refer to a single page, a set of pages or "all" cached entries. The memory system monitoring circuitry 16 could be responsive to any "TLB Invalidate" command, or alternatively to only such commands which conflict with the current working pages of the hardware accelerator 12.

Another example of predetermined memory system operations concern the re-use of a physical page in memory. If the operating system 20 wishes to reuse such a physical page in memory, then it will perform the following steps:

| Disable Page( ) | as previous section, may have been performed some time ago |
|---|---|
| Cache Clean and Invalidate | ensure any previous cached copies are invalidated, and dirty lines written back to physical memory ensure |
| DMB | Cache C&I complete |
| DMA/Copy to Store | Copy outgoing data back to backing store |
| Wait For Completion( ) | Implicit DMB |
| DMA/Copy from Store | Copy ingoing data into physical memory (using a maintenance mapping) |
| Waite For Completion( ) | |
| Write New Page( ) | Similar to Disable Page( ) - enable new use of physical page |

The technique in this case exploits the realisation that the memory system monitoring circuitry 16 can observe the "Cache, Clean and Invalidate" operation (particularly in combination with a previously disabled page) as an indication that the operating system 20 may be paging the memory in question back to the backing store, e.g. hard disk 8. The operating system 20 will wait for the cache maintenance operation to complete before overwriting the physical memory and according the hardware accelerator 12 can make use of this to hold off such cache maintenance operations whilst it writes back any data values held within the hardware accelerator 12 to the memory system 14, 6, 8.

The system may discriminate between explicit maintenance operations and coherency actions that occur as part of a cache coherence system. For example, if a processor reads a block cached by an accelerator, it may clean this block to memory and subsequently re-read the block so that it continues with processing. Conversely, if a processor causes an explicit page disable/cache clean and invalidate, the accelerator may clean and invalidate the block involved and then suspend itself raising an appropriate signal (or status bit) that provides an indication of its suspension back to the processor 10.

It is also possible for the system to snoop writes to the memory containing the page tables and accordingly determine whether one of the page table entries has been modified and take this as indicative of actions which should result in halting and cleaning of the hardware accelerator 12. The system could also snoop accesses to data values within the memory 14, 6, 8 that are also required for processing by the hardware accelerator 12 itself. A further example is that the system could discard or clean and invalidate, all cached copies upon explicit cache/TLB maintenance and prefetched operations—if a required page has been disabled, then the subsequent fetch by the accelerator 12 will halt and the accelerator 12 will suspend and signal this suspension to the processor 10.

Further examples of predetermined operations indicative of a need to clean and flush the accelerator are a clean operation being performed upon one or more cache lines of a cache memory storing data corresponding to data values subject to processing via the hardware accelerator and a cache snoop operation being performed upon one or more cache lines of a cache memory storing data corresponding to data values subject to processing via the hardware accelerator. The monitoring circuitry 16 may be configured to be responsive to these forms of operation.

Figure 2:
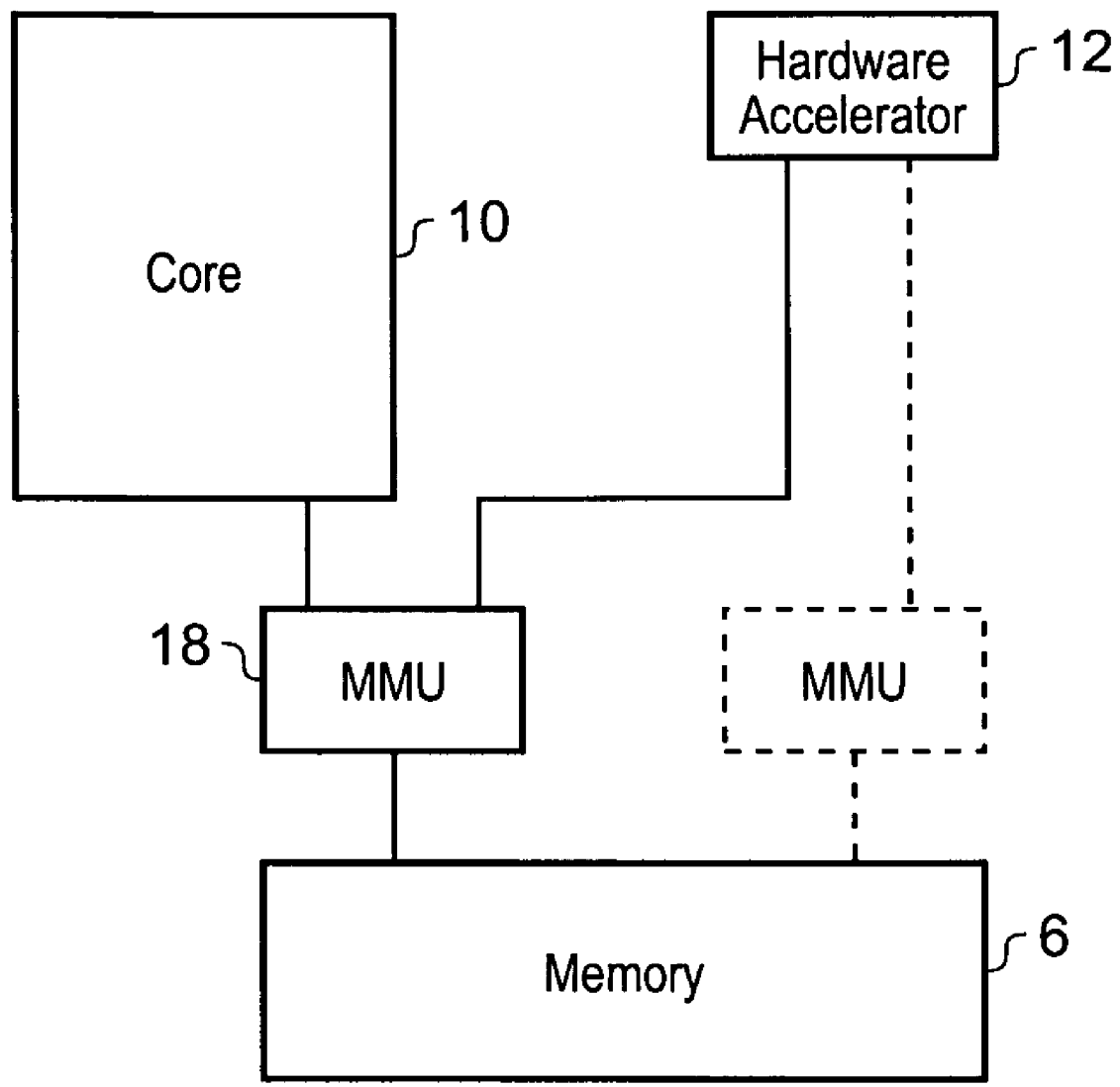
FIG. 2 schematically illustrates two different ways in which a programmable general purpose processor may share the memory system with the hardware accelerator.

FIG. 2 schematically illustrates an arrangement in which the programmable general purpose processor 10 and the hardware accelerator 12 can be seen to share a memory system in the form of a memory management unit 18 and a main memory 6. In dotted line form is shown an alternative arrangement in which the hardware accelerator 12 may have its own separate memory management unit storing its own page table data such that the hardware accelerator 12 can operate in a different context with different virtual-to-physical mappings than those being used by the programmable general purpose processor 10.

Figure 3:
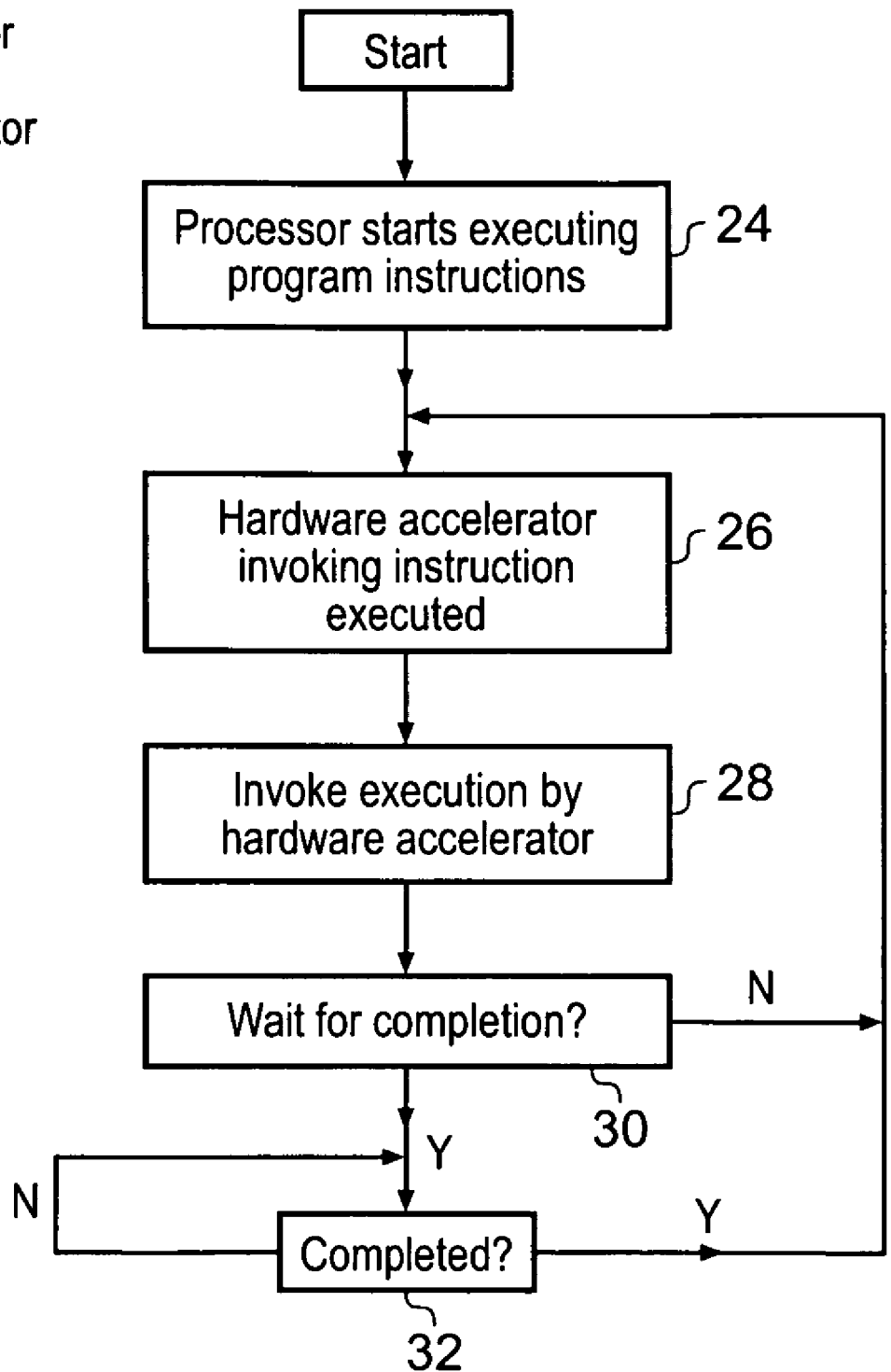
FIG. 3 is a flow diagram schematically illustrating how the programmable general purpose processor may invoke the processing upon the hardware accelerator.

FIG. 3 is a flow diagram schematically illustrating how the processor 10 can invoke processing by the hardware accelerator 12. At step 24 the processor 10 starts executing program instructions. At step 26 a hardware accelerator invoking instruction is executed by the processor 10 and this causes the processor 10 to send appropriate signals to the hardware accelerator 12 to trigger its processing activity. The hardware accelerator 12 may have been preconfigured (set up) so as to be able to start its processing upon receipt of a simple start command. The type of pre-configuration involved may be the supply of appropriate pointers to data structures to be processed, the supply of key values to be used in encryption/decryption, and the like. At step 28, the execution by the hardware accelerator is invoked. At step 30 a determination is made as to whether or not the invocation performed is one for which it is desired that the processor 10 should await completion before it itself continues processing further. If this is not an invocation where "wait for completion" is required, then processing returns to step 26. If a "wait for completion" is required, then processing passes to step 32 where completion of the processing is detected before processing is returned to step 26.

Figure 4:
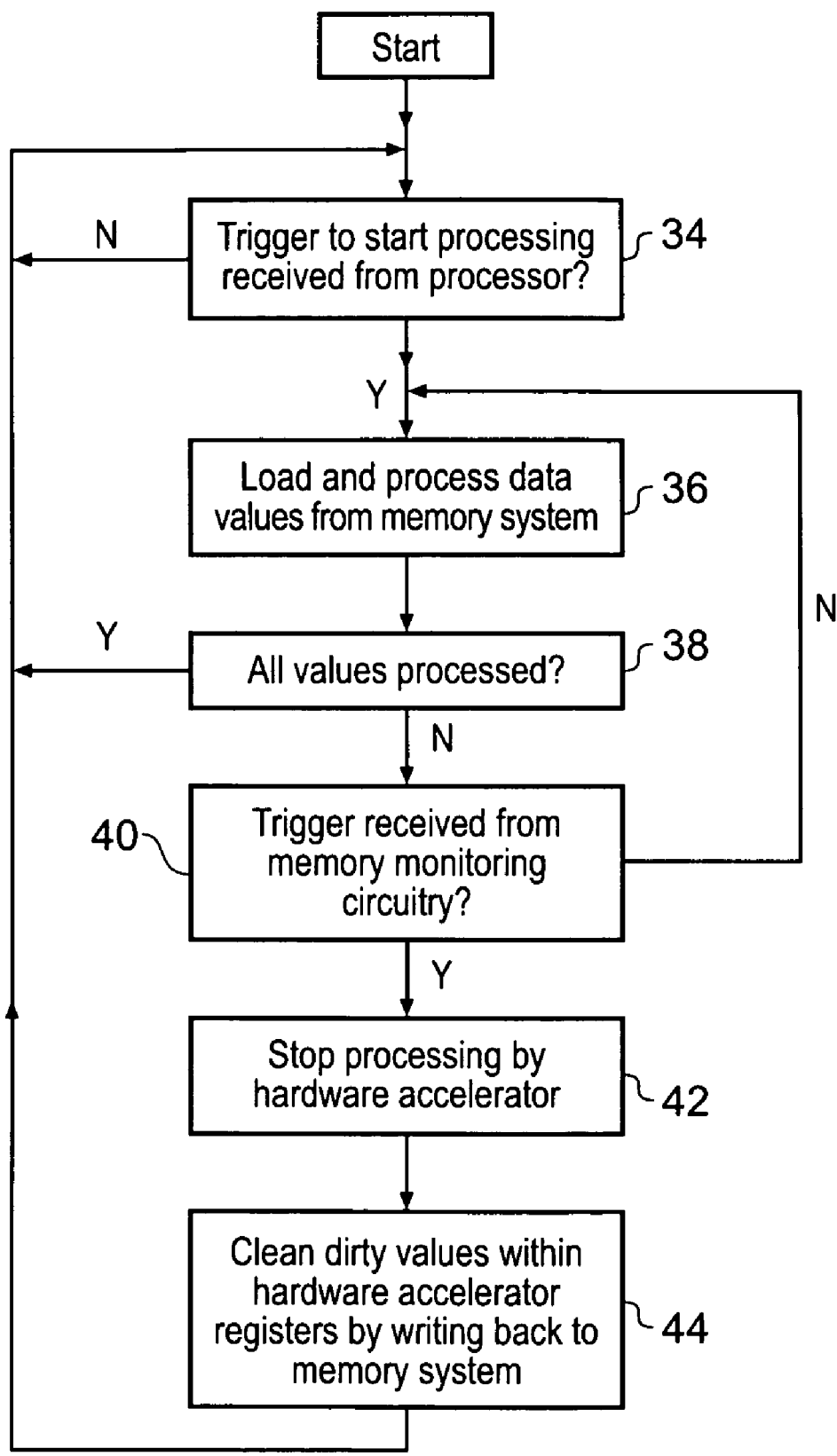
FIG. 4 is a flow diagram schematically illustrating control of the hardware accelerator so as to be responsive to a trigger signal received from memory monitoring circuitry.

FIG. 4 is a flow diagram schematically illustrating control of the hardware accelerator 12. At step 34 the hardware accelerator 12 awaits receipt of a trigger to start its processing. When such a trigger is received, processing proceeds to step 36 where the hardware accelerator 12 loads its temporary variables from the memory system and performs its processing thereupon, including writing back result values as appropriate. At step 38, a determination is made as to whether all of the values that were to be processed have been processed by the hardware accelerator 12. If all values have been processed, then control returns to step 34 to await the next trigger from the processor 10 to start further processing operations by the hardware accelerator 12. If the determination at step 38 was that there are still further values to be processed, then a check is made as to whether a trigger signal has been received from the memory system monitoring circuit 16 indicating that processing should be halted and a clean operation performed due to other activity by the processor 10. If such a trigger has not been received from the memory system of the monitoring circuitry 16, then processing returns to step 36. However, if such a trigger signal has been received from the memory system monitoring circuitry 16, then processing proceeds to step 42 at which the processing by the hardware accelerator 12 is halted. Step 44 then cleans any dirty values within the hardware accelerator registers 21 by writing them back to the memory system 14, 6, 8. Processing then returns to step 34.

Figure 5:
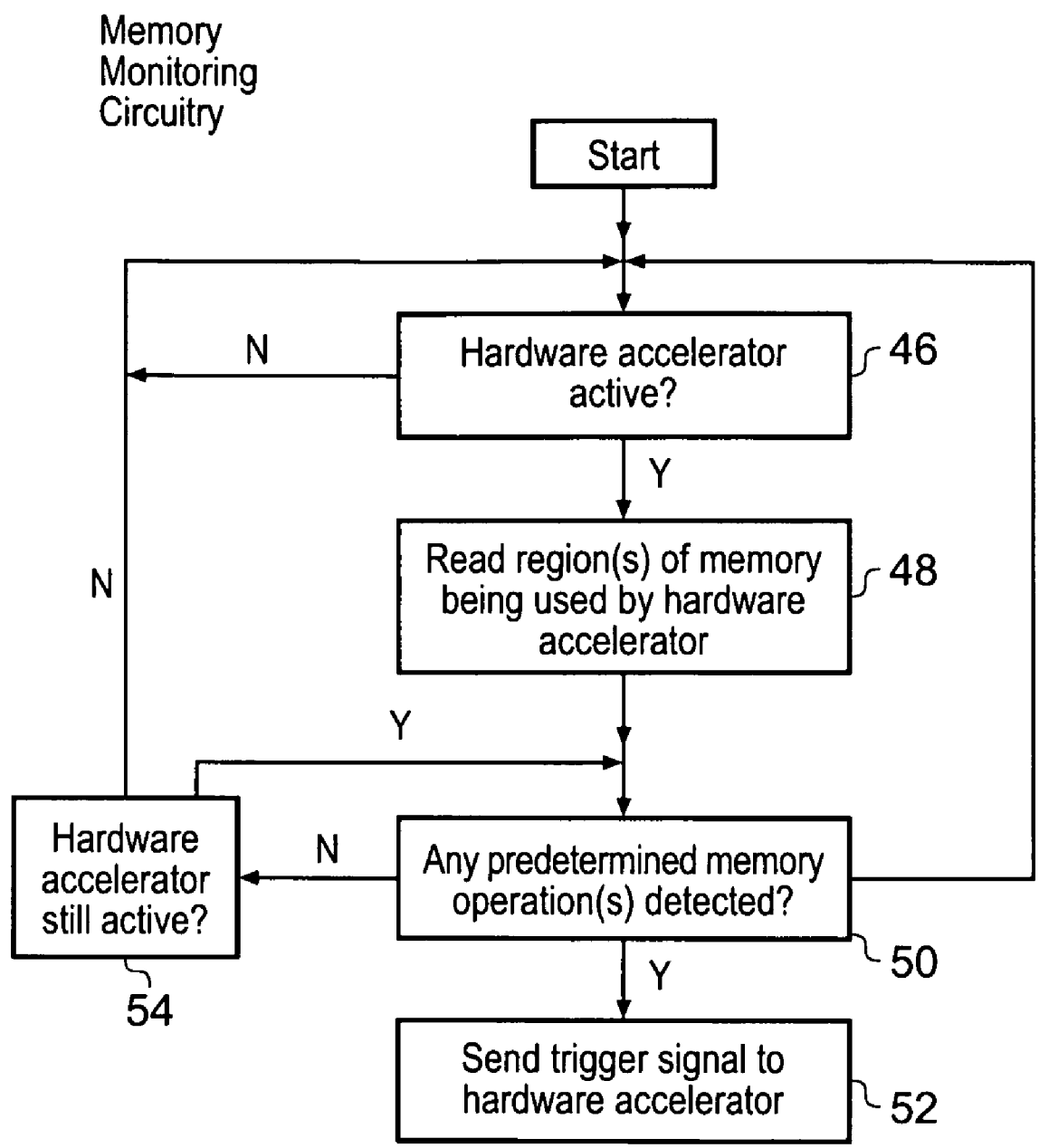
FIG. 5 is a flow diagram schematically illustrating how memory monitoring circuitry may be responsive to the determined memory operations performed by the programmable general purpose processor to generate a trigger signal that is supplied to the hardware accelerator.

FIG. 5 is a flow diagram schematically illustrating the action of the memory system monitoring circuit 16. At step 46, the circuitry waits until the hardware accelerator 12 is active. When the hardware accelerator 12 is active, processing proceeds to step 48 where the regions of memory being used by the hardware accelerator 12 are read such that, in this example, the memory system monitoring circuitry 16 can be responsive to operations in respect of those particular regions, rather than potentially conflicting memory operations in general. Step 50 then determines whether any predetermined memory options have been detected that are indicative of a need for the hardware accelerator 12 to halt its processing and clean itself. If such memory operations have been detected, then step 52 generates the appropriate trigger signal which is sent to the hardware accelerator to trigger it to perform such a halt-and-clean operation. If no such predetermined memory operations have been detected, processing proceeds from step 50 to step 54 at which a check is made as to whether or not the hardware accelerator is still active. If the hardware accelerator is still active, then processing returns to step 50. If the hardware accelerator is no longer active, then processing returns to step 46.

The above techniques are related to the techniques described in co-pending US Patent Applications entitled "Providing Secure Services to A Non-Secure Application" and "Protecting the security of secure data sent from a central processor for processing by a further processing device" and bearing U.S. Ser. Nos. 12/003,857 and 12/003,858, respectively. The disclosure of these two co-pending applications is incorporated herein in its entirety.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data comprising:
a programmable general purpose processor operating under program instruction control to perform data processing operations;
a memory system coupled to said processor, said memory system operating to store data values to be processed by said processor;
a hardware accelerator coupled to said processor and to said memory system, said hardware accelerator having at least one register storing respective data values that are temporary variables to be processed by said hardware accelerator, said data values within said at least one register being read from said memory system and cached within said at least one register; and
memory system monitoring circuitry, separate from said processor and coupled to said hardware accelerator and said memory system, said memory system monitoring circuitry generating a trigger signal in response to at least one predetermined memory operation being preformed upon said memory system by said processor, wherein said hardware accelerator is responsive to said trigger signal to halt processing performed by said hardware accelerator and to perform a cleaning operation whereby any data values within said at least one register differing from the corresponding data values within said memory system are written back to said memory system.

2. Apparatus as claimed in claim 1, wherein said memory system includes a translation lookaside buffer and said at least one predetermined memory operation include an invalidate of an entry within said translation lookaside buffer corresponding to a data value being used by said hardware accelerator.

3. Apparatus as claimed in claim 1, wherein said memory system includes a memory management unit responsive to page table data and said at least one predetermined memory operation include a modification of an entry within said page table data corresponding to a data value used by said hardware accelerator.

4. Apparatus as claimed in claim 1, wherein said memory system includes a cache memory and said at least one predetermined memory operation includes at least one clean operation being performed upon at least one cache line stored within said cache memory and corresponding to data values subject to processing by said hardware accelerator.

5. Apparatus as claimed in claim 1, wherein said memory system includes a cache memory and said at least one predetermined memory operation include at least one clean and invalidate operation performed upon at least one cache line stored within said cache memory and corresponding to data values subject to processing by said hardware accelerator.

6. Apparatus as claimed in claim 1, wherein said processor generates broadcast memory management commands and said memory system monitoring circuitry detects said at least one predetermined memory operation by receipt of at least one corresponding broadcast memory management command.

7. Apparatus as claimed in claim 1, wherein said at least one predetermined memory operation comprises accesses by said processor to data values within regions of memory address space within said memory system being used by said hardware accelerator.

8. Apparatus as claimed in claim 1, wherein said at least one predetermined memory operation comprises cache snoop operations to data values within regions of memory address space within said memory system being used by said hardware accelerator.

9. Apparatus as claimed in claim 1, wherein said processor operates under control of an operating system program and said operating system program manages said memory system independently of said hardware accelerator.

10. Apparatus as claimed in claim 1, wherein said data values to be processed by said hardware accelerator are stored within at least one region within said memory system that is shared with said processor.

11. Apparatus as claimed in claim 1, wherein said processor and said hardware accelerator operate within a common virtual memory address space.

12. Apparatus as claimed in claim 1, wherein said processor and said hardware accelerator share a memory management unit and page table data.

13. Apparatus as claimed in claim 1, wherein said processor and said hardware accelerator operate in different contexts.

14. Apparatus for processing data comprising:
programmable general purpose processor means for performing data processing operations operating under program instruction control;
memory system means, coupled to said processor means, for storing data values to be processed by said processor means;
hardware accelerator means, coupled to said processor means and to said memory system means, for processing data values, said hardware accelerator means having at least one register means for storing respective data values, wherein said data values are temporary variables to be processed by said hardware accelerator means, and said data values within said at least one register means are read from said memory system means and cached within said at least one register means; and
memory system monitoring means, coupled to said hardware accelerator and separate from said processor means, for generating a trigger signal in response to at least one predetermined memory operation performed upon said memory system means by said processing means, wherein said hardware accelerator means is responsive to said trigger signal to halt processing being performed by said hardware accelerator means and to perform a cleaning operation whereby any data values within said at least one register means differing from the corresponding data values within said memory system means are written back to said memory system means.

15. A method of processing data comprising the steps of:
performing data processing operations with a programmable general purpose processor operating under program instruction control;
storing data values to be processed by said processor in a memory system coupled to said processor;
storing, within at least one register of a hardware accelerator respective data values that are temporary variables to be processed by said hardware accelerator, said hardware accelerator being coupled to said processor and to said memory system and said data values within said at least one register is read from said memory system and cached within said at least one register;
generating a trigger signal in response to at least one predetermined memory operation preformed by said processor using memory system monitoring circuitry coupled to said hardware accelerator and said memory system, said memory system monitoring circuitry is separate from said processor; and
performing, in response to said trigger signal halting processing being performed by said hardware accelerator, a cleaning operation whereby any data values within said at least one register differing from the corresponding data values within said memory system are written back to said memory system.

16. A method as claimed in claim 15, wherein said memory system includes a translation lookaside buffer and said at least one predetermined memory operation includes an invalidate of an entry within said translation lookaside buffer corresponding to a data value being used by said hardware accelerator.

17. A method as claimed in claim 15, wherein said memory system includes a memory management unit responsive to page table data and said at least one predetermined memory operation includes a modification of an entry within said page table data corresponding to a data value used by said hardware accelerator.

18. A method as claimed in claim 15, wherein said memory system includes a cache memory and said at least one predetermined memory operation includes at least one clean operation being performed upon at least one cache line stored within said cache memory and corresponding to data values subject to processing by said hardware accelerator.

19. A method as claimed in claim 15, wherein said memory system includes a cache memory and said at least one predetermined memory operation includes at least one clean and invalidate operation performed upon at least one cache line stored within said cache memory and corresponding to data values subject to processing by said hardware accelerator.

20. A method as claimed in claim 15, further comprising generating with said processor broadcast memory management commands and detecting said at least one predetermined memory operation by receipt of at least one corresponding broadcast memory management command.

21. A method as claimed in claim 15, wherein said at least one predetermined memory operation comprises accesses by said processor to data values within regions of memory address space within said memory system being used by said hardware accelerator.

22. A method as claimed in claim 15, wherein said at least one predetermined memory operation comprises a cache snoop operation to data values within regions of memory address space within said memory system used by said hardware accelerator.

23. A method as claimed in claim 15, wherein said processor is controlled by an operating system program and said operating system program manages said memory system independently of said hardware accelerator.

24. A method as claimed in claim 15, wherein said data values to be processed by said hardware accelerator are stored within at least one region within said memory system that are shared with said processor.

25. A method as claimed in claim 15, wherein said processor and said hardware accelerator operate within a common virtual memory address space.

26. A method as claimed in claim 15, wherein said processor and said hardware accelerator share a memory management unit and page table data.

27. A method as claimed in claim 15, wherein said processor and said hardware accelerator operate in different contexts.

* * * * *